United States Patent [19]

Chakraborty et al.

[11] Patent Number: 5,198,405

[45] Date of Patent: Mar. 30, 1993

[54] CATALYST FOR THE REMOVAL OF HYDROGEN FROM AN ATMOSPHERE CONTAINING HYDROGEN, OXYGEN AND STEAM

[75] Inventors: Amiya K. Chakraborty, Erftstadt; Jurgen Rohde, Bergisch-Gladbach; Karl-Heinz Klatt, Julich; Helmut Wenzl, Julich; Ralf Konrad, Sinn, all of Fed. Rep. of Germany

[73] Assignees: Forschungszentrum Julich GmbH, Julich; Gesellschaft fur Reaktorsicherheit, Cologne, both of Fed. Rep. of Germany

[21] Appl. No.: 724,747

[22] Filed: Jul. 2, 1991

[30] Foreign Application Priority Data

Jul. 12, 1990 [DE] Fed. Rep. of Germany ....... 4022236
Dec. 22, 1990 [DE] Fed. Rep. of Germany ....... 4041661

[51] Int. Cl.$^5$ .......................................... B01J 32/00
[52] U.S. Cl. .................................... 502/300; 502/439
[58] Field of Search ............... 502/326, 439, 527, 300

[56] References Cited

U.S. PATENT DOCUMENTS

| | | | |
|---|---|---|---|
| 3,773,894 | 11/1973 | Bernstein et al. | 502/314 X |
| 3,873,472 | 3/1975 | Oshima et al. | 502/327 |
| 3,886,095 | 5/1975 | Ford et al. | 423/213.2 |
| 4,252,690 | 2/1981 | Kamiya et al. | 502/313 X |

*Primary Examiner*—W. J. Shine
*Attorney, Agent, or Firm*—Scully, Scott, Murphy & Presser

[57] ABSTRACT

A catalyst for the removal or elimination of hydrogen from an atmosphere containing hydrogen, oxygen and steam. The catalyst consists of a metal or a corresponding alloy which influences the oxidation of the hydrogen, and which is applied onto a substrate material as a catalyst layer. The catalyst layer is applied onto the substrate which is formed from plate or sheet metal, fabric, mesh or granulate and consists of a support material which will regard to its expansion under a temperature change is compatible with the catalyst layer and is corrosion-resistance of the substrate material prevents the oxidation thereof in the presence of steam.

7 Claims, 5 Drawing Sheets

CATALYST FOR THE REMOVAL OF HYDROGEN FROM AN ATMOSPHERE CONTAINING HYDROGEN, OXYGEN AND STEAM

BACKGROUND OF THE INVENTION

1. Field of the Invention

The present invention relates to a catalyst for the removal or elimination of hydrogen from an atmosphere containing hydrogen, oxygen and steam. The catalyst consists of a metal or a corresponding alloy which influences the oxidation of the hydrogen, and which is applied onto a substrate material as a catalyst layer.

The elimination or removal of hydrogen from a gas mixture which contains hydrogen and oxygen and, resultingly, is explosive in nature, is of particular significance to nuclear power plant accidents. Above all, such gas mixtures can be encountered during core meltdown accidents of light-water reactors, as well as in reactors which are modified to heavy water. Additionally, during the storage or; final storage of the burned-down fuel rods, hydrogen and its isotopes which are present in the enclosed oxygen-containing atmosphere, are released thereby and carry along a certain potential for danger.

2. Discussion of the Prior Art

In the disclosure of copending U.S. patent application Ser. No. 225,009, commonly assigned to the assignees of the present application, there are described catalyst layers which are constituted from PdNiCu alloys. It has evidenced itself that such catalysts constituted from Pd, Ni, Cu as well as PdAg or PdCu which are applied onto carrier or substrate materials exhibit a considerable potential for a utilization in the removal of hydrogen during accident situations connected with core meltdown. These alloys possess a good catalytic activity, even in the presence of toxic catalyst materials; for example, such as CO, J and S. The alloys evidence extremely short delay periods up to the commencement of a catalytic reaction.

In accordance with theoretical computations concerning the course of a core melt-down accident, there is to be expected that the release of the hydrogen will be related with the release of small quantities of $CO_2$ and CO. Moreover, a considerable quantity of steam will be released during the accident. The steam is present in partially a sub-cooled and over a period of time in a super-heated condition. The release of the steam over time depends primarily upon the sequence of the accident. However, even at the same sequence for the accident will the steam content of steam be differently encountered in the different spatial or room divisions of the safety containment. It allows itself to be evidenced that the release of the steam must be considered from practically the beginning of the nuclear core melt-down accident. In accordance with the division of the spaces or chambers, the steam content will pass through different peaks over a period of time due to condensation and a varying release of steam. The steam content can reach in a chamber or containment of a security containment short-term values of from less than 20% up to 95%.

While there can be counted on the release of steam from the very beginning of the accident, the initial release of the hydrogen takes place, at a certain delay, after about one hour. The highest hydrogen concentrations are to be expected, especially after the failure of the reactor pressure container, within the first hours of the release thereof in the middle and lower installation chambers or spaces. Over the long-term, in the atmosphere of the security containment there can form themselves higher concentrations of ignitable gas mixtures, and upon a combustion of the hydrogen will endanger the safety containment.

An analysis of the different accident sequences leads to the conclusion that, with regard to such accident situations, there must be counted on the long-term release of steam. This signifies that the catalyst for the removal of hydrogen must also be exposed to a flow of steam over a lengthy period of time. Hereby, there must be considered that light-water reactors are operated with deionized water, which is particularly known for its corrosive capability.

SUMMARY OF THE INVENTION

Accordingly, it is an object of the present invention to provide catalysts for the removal of hydrogen from atmospheres containing hydrogen and oxygen which will not lose their catalytic activity even with the additional presence of water vapor or steam in the atmosphere.

The foregoing object is inventively attained in that a substrate material in the form of a plate, fabric, mesh or granulate is thermally compatibly bonded with the catalyst layer, and is corrosion-resistant with regard to steam.

In accordance with the foregoing, the catalyst layer is applied onto the substrate which is formed from plate or sheet metal, fabric, mesh or granulate and consists of a support material which will regard to its expansion under a temperature change is compatible with the catalyst layer and is corrosion-resistant with respect to steam. The corrosion resistance of the substrate material prevents the oxidation thereof in the presence of steam. Moreover, upon a tearing open of the catalyst layer, there will not be formed any oxidation products which can disturb the catalyzation. The catalytic activity of the catalyst remains intact even in an atmosphere containing steam. It is also important that because of the temperature compatibility of the substrate material and the catalyst layer both remain better adherent to each other. Any flaking off is thereby prevented.

As a support or substrate material there are particularly suited low-alloyed ferritic steels with proportionally low contents of nickel and chromium with the DIN identification for superior alloy steels such as DIN 1.5732, DIN 1.5755 and other high-quality steels from this series, as well as austenitic steels, which distinguishes themselves through a low resistance to corrosion in comparison with carbon steels.

In order to increase the thermal compatibility between the catalyst layer and the substrate material it is contemplated, pursuant to the invention, the catalyst layer and substrate material have approximately equal thermal linear coefficients of expansion. Thus, to be taken into consideration for a PdNiCu layer are substrate materials with coefficients of expansion of $11.7 \times 10^{-6}$ cm/°C. Available for selection are ferritic steels, preferably the above mentioned low-alloyed, high heat resistant steels in the ferritic condition with Cr and Ni.

Since the substrate or support plate possesses a linear coefficient of expansion of $8.9 \times 10^{-6}$ cm/°C., then for a Pt-layer there are preferred substrate materials of pure Ti, Ti-8.5% Mn, Ti-5% Al, as well as the nickel-rich alloys with Cu (Monel metal) with coefficients of expansion of about $8.7 \times 10^{-6}$ cm/°C.

Of significance for the thermal compatibility is also the heat conductivity of the substrate material and the catalyst layer, and the formation of intermetallic phases. There is only slight difference between the heat conductivity of the substrate material and the catalyst layer. There is no formation of intermetallic phases; for instance, in the two-material system of iron and palladium; Pd as the catalyst and iron as the substrate material lead to phases with lower embrittlement.

Upon the release of aerosols from fission products and structural materials, in the presence of steam there are formed acidiferous as well as alkaline solutions which attack the catalyst, especially at elevated temperatures. Consequently, pursuant to the invention there are selected substrate materials which provide stability to catalysts in the presence of such solutions, as well as in the presence of toxic materials as boric acid or CO.

In order that the substrate material itself does not evidence any structural conversion during operation, and as a consequence thereof, stresses are generated between the substrate material and catalyst layer, which cause a flaking away of the catalyst layer, there is preferred the use of substrate material which, in the temperature range during the rise in temperature and at operating temperature, forms only such mixed crystals or solid solutions phases with hydrogen and oxygen, which produce only slight changes in the matrix parameters. In that manner, the substrate material and catalyst layer remain constantly compatible over the entire range of the temperature rise, even upon a formation of mixed crystals or solid solutions and phases.

Important to the selection of the substrate materials are also the aspects which pertain to the hydrogen solubility of the substrate material, to the formation of oxidation layers, and to the surface roughness of the substrate material. Expediently, the substrate material possess a low degree of solubility for the hydrogen so that, during cooling down of the substrate material only a small amount of hydrogen is set free. Oxide layers between the substrate material, and catalyst layer prevent the formation of a load-carrying bonding between the substrate and the layer and favor a flaking away or separation of the catalyst layer. The oxide layers on the substrate material accordingly should be removed prior to the application of the catalyst layer. The catalyst layer is thereby preferably applied onto a sand-blasted substrate material. This surface treatment also increases the catalyst surface, inasmuch as during the application of the layer, the vapor-deposited or dusted-on catalyst layer is deposited in the recesses or crevices formed in the sand-blasted surface of the substrate material and will anchor itself thereto while maintaining the rough surface within range of the microscopic height and depth finish thereof.

Overall, by means of the invention there is hereby achieved that the catalyst will not detach or loosen itself from the substrate material during the catalysis due to the development of heat. A springing or flaking away of particles or layer areas of the catalyst layer is avoided. Thereby, there is also prevented that such particle or slaked-off layer areas from coming into glowing heat during further catalytic action as a result of any lack in the conducting off of heat so as to conceivably be able to ignite the hydrogen-containing atmosphere.

BRIEF DESCRIPTION OF THE DRAWINGS

Reference may now be had to the following detailed description of preferred embodiments of the present invention, taken in conjunction with the accompanying drawings; in which.

EXAMPLE 1

The catalytic action of a PdNiCu alloy, which contained 95% Pd by weight, 4% Ni by weight, 1% Cu by weight, and which was applied on both sides of a carrier or substrate plate consisting of ferritic steel DIN 1.5755 (the linear coefficient of expansion for the steel of $11.7 \times 10^{-6}$ cm/°C. corresponds to the coefficient of expansion of the PdNiCu alloy of $11.76 \times 10^{-6}$ cm/°C.), was investigated in a reaction chamber with a volume of 6.5 liter. In the reaction chamber there allowed themselves to be set realistic conditions for core melt-down accidents with correlated gas mixtures. Located in the reaction chamber was a catalyst plate having a 48 cm² surface area.

Prior to the beginning of the catalytic reaction, the catalyst plate was exposed to a saturated steam atmosphere at 100° C. and 1 bar. The effective period consisted of 3.25 hours. This serves for determining as to whether the saturated steam attacked the substrate material through the formation of fissures in the surface of the catalyst layer and which would disturb the immediate commencement of the catalytic reaction. Thereafter 1.29 bar air and 0.11 bar $H_2$ was introduced into the reaction chamber. The atmosphere then evidences 44% steam by volume, 51.6% air by volume, and 4.4% $H_2$ by volume. As a result of the commencing catalytic oxidation of the hydrogen, subsequent to this introduction, the pressure in the reaction chamber fell within two minutes from 2.51 bar to 2.45 bar. The pressure then fell off slowly and at a constant rate. From this there can be ascertained that the oxidation reaction began rapidly and was already concluded after two minutes; in effect, the hydrogen was thus present in a bound manner.

Within the same interval of time, the temperature in the catalyst plate rose from initially 100° C. within 1 minute up to a maximum temperature of 220° C. The temperature again dropped off rapidly. After 7 minutes, the plate again reached its initial temperature of 100° C.

After the course or duration of the catalytic reaction, the catalyst evidenced a glossy surface. A formation of fissures in catalyst layer could not be ascertained.

EXAMPLE 2

Figure 2:
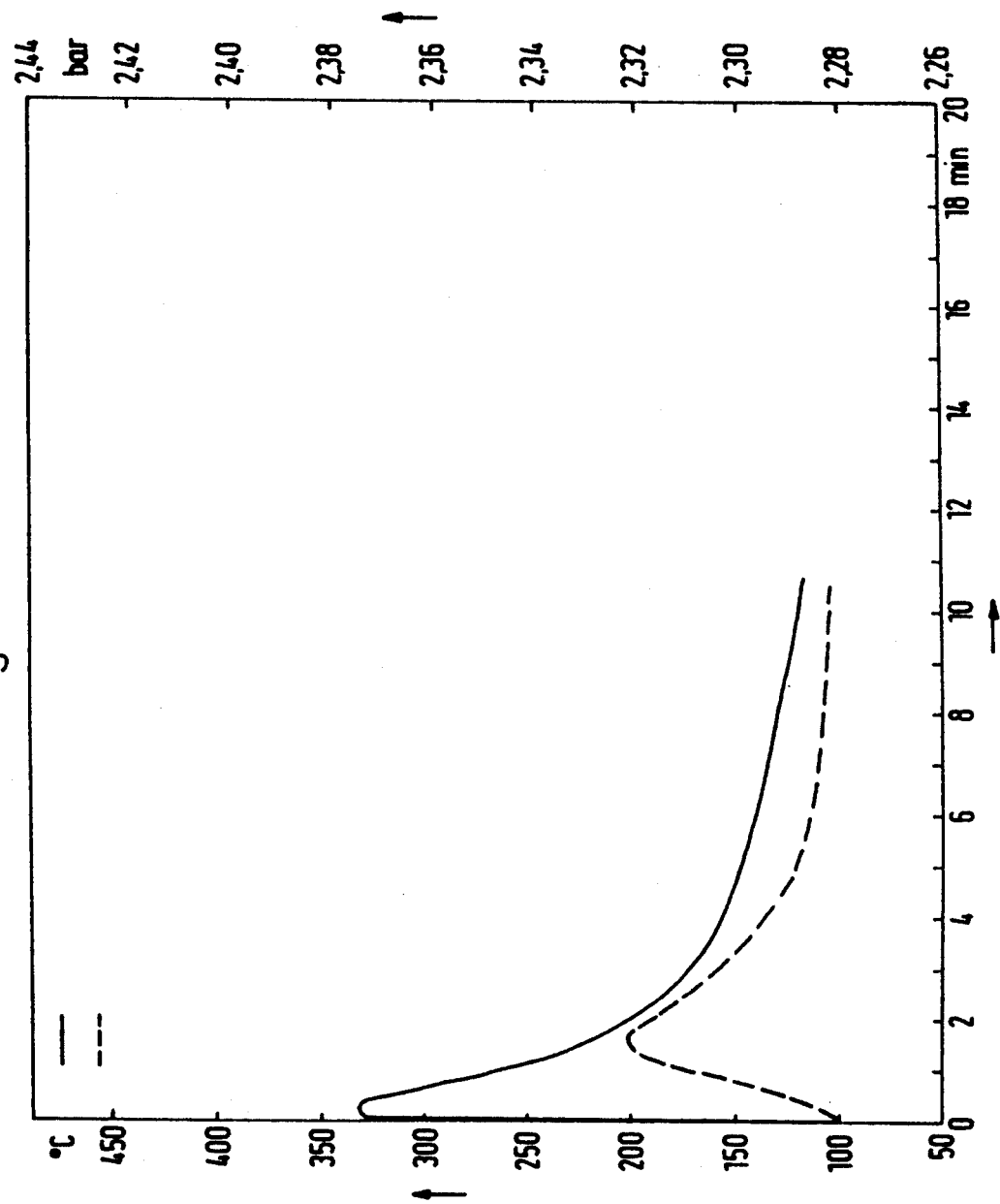
FIG. 2 illustrates the plot of a pressure and temperature course as in FIG. 1 for a catalytic oxidation on the same PdNiCu alloy; however, applied onto a substrate plate consisting of steel DIN 1.5732.
Figure 3:
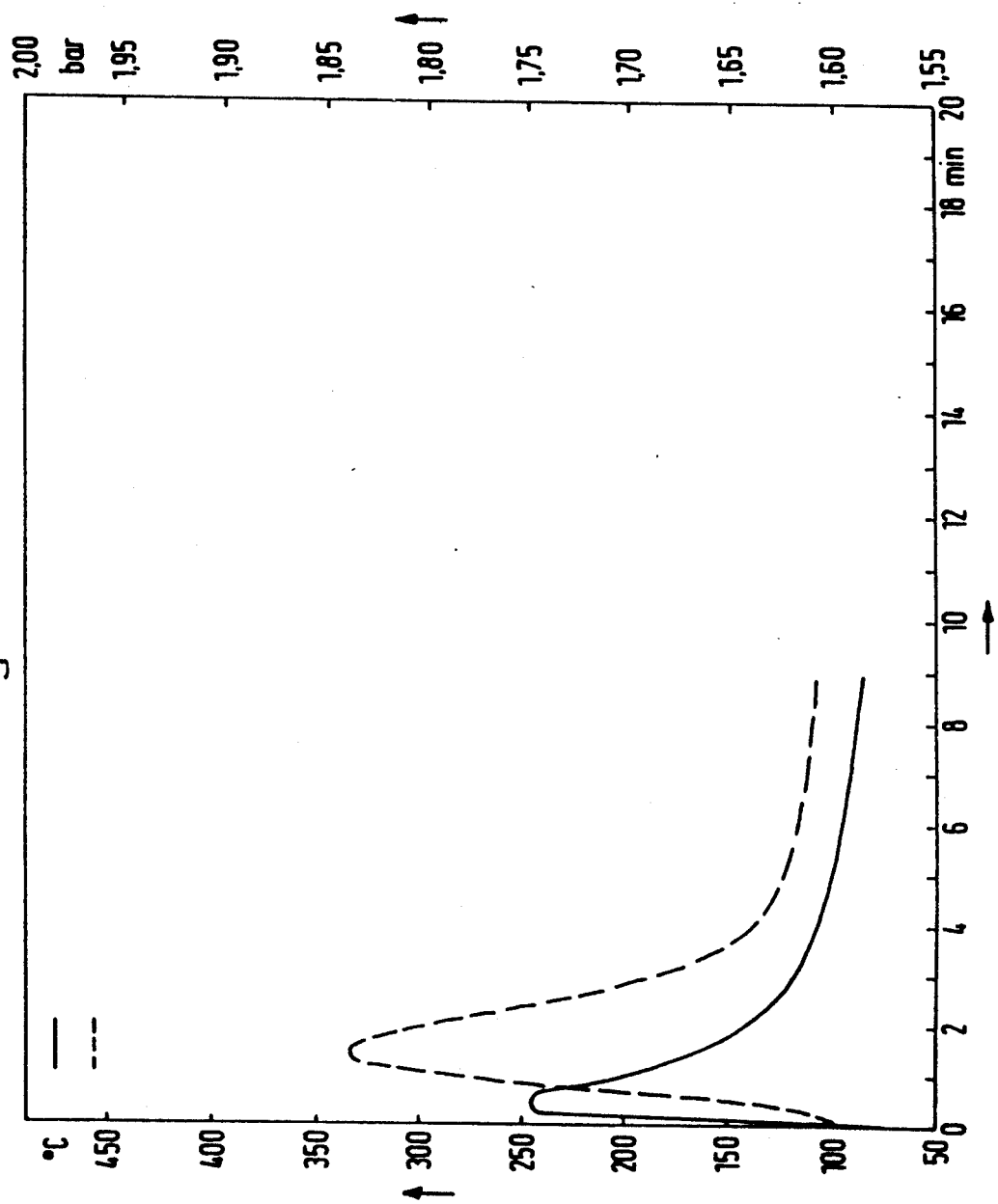
FIG. 3 illustrates a plot of the pressure and temperature cycle as in FIG. 2 at a catalytic oxidation on the catalyst set forth in FIG. 2 and on the same substrate material in an atmosphere with 57.6% steam by volume, 32.9% air by volume, and 9.5% by volume of $H_2$.

In FIG. 2 there is represented a plot of the course in the reaction of a catalytic oxidation of hydrogen for a PdNiCu alloy, which possesses the same composition as in Example 1. The PdNiCu alloy is vapor-deposited on both sides of a substrate plate constituted from ferritic steel DIN 1.5732. The linear coefficient of expansion of $11.7 \times 10^{-6}$ cm/°C. of the steel coincides closely with that of the PdNiCu alloy. The substrate plate is 0.5 mm thick. In general, for the catalytic action there is available 48 cm$^2$ of catalyst surface.

Figure 1:
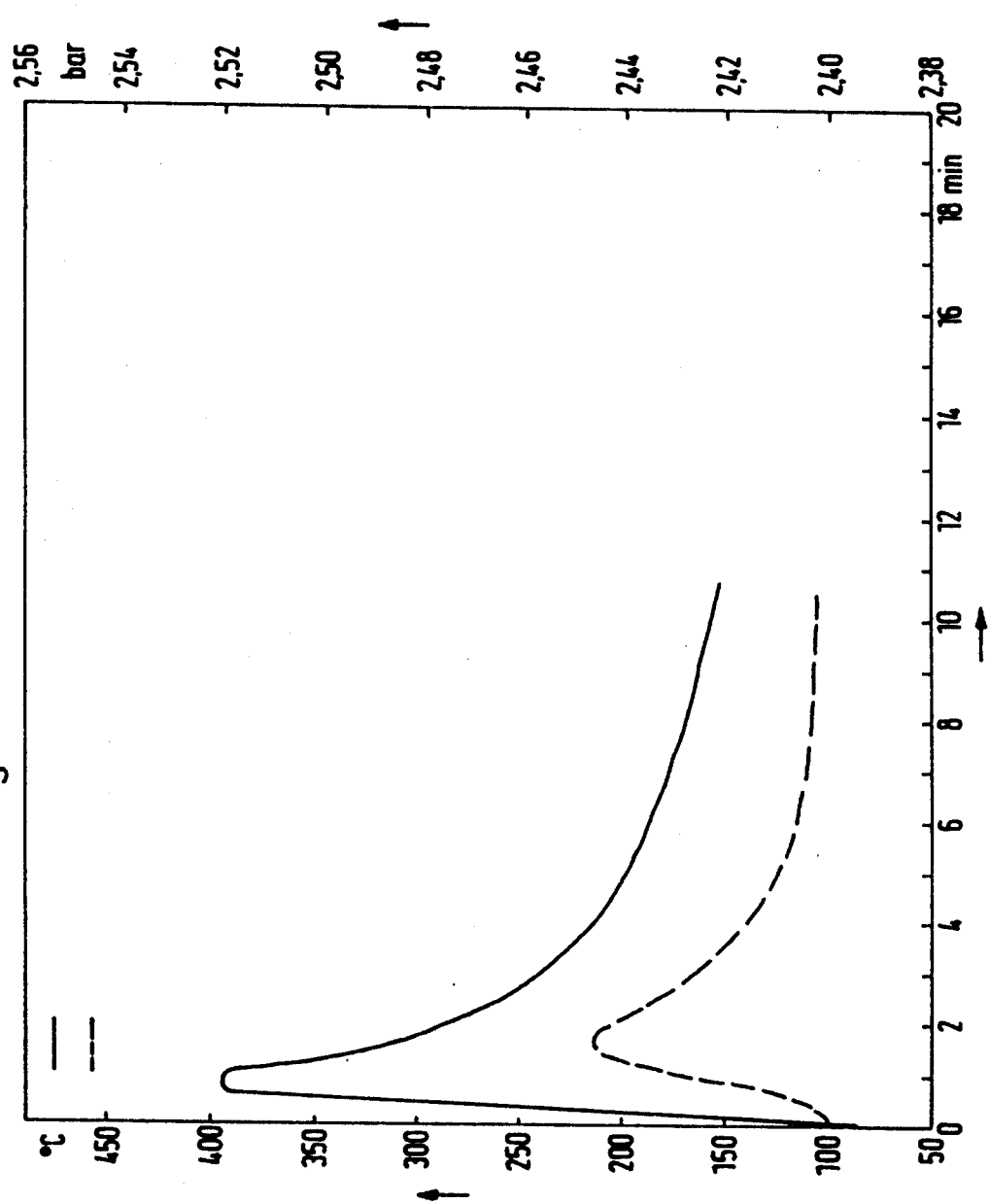
FIG. 1 illustrates the plot of a pressure course in a reaction chamber at the catalytic oxidation of hydrogen on a PdNiCu alloy having 95% Pd by weight, 4% Ni by weight, and 1% Cu by weight, which applied as a layer on both sides of a sheet metal substrate consisting of ferritic steel DIN 1.5755, as well as the plot of thereby occurring temperature course in the sheet metal substrate after exposure in an open hydrogen and oxygen-containing saturated steam atmosphere at 100° C.

In FIG. 2, the course of the pressure in the reaction chamber, as well as the temperature course of the catalyst plate, is shown in the same manner as in FIG. 1. In a deviation from the first example, the catalyst plate with the substrate material consisting of steel was exposed to a saturated steam atmosphere at 100° C. for a period of 72 hours prior to the catalytic reaction.

In this example, the reaction chamber contained a gas atmosphere with the following constituents: 42.2% steam by volume, 53.6% air by volume. Into this gas mixture there was introduced 4.2% hydrogen by volume.

As in the example pursuant to FIG. 1, also in this instance did the catalytic reaction begin immediately after the introduction of the hydrogen into the gas atmosphere.

With a rising pressure in the reaction chamber upon the addition of the hydrogen, there also rises the temperature in the catalyst plate. The catalytic oxidation of the hydrogen leads to a pressure drop-off. The pressure in the chamber drops from about 2.37 bar to 2.3 bar within a few minutes. The temperature in the catalyst sheet metal rises from initially 100° C. within about 2 minutes to a maximum of about 205° C. Thereafter it drops within four minutes to again the initial value of 100° C. The hydrogen is completely converted into steam.

Visual as well as light-microscopic investigations after carrying out the experiment clearly showed that the catalyst surface was metallic and free from the formation of fissures and deposits.

EXAMPLE 3

With this example there was demonstrated the ability of a catalytic oxidation for an atmosphere possessing a high hydrogen constituent. As in Example 2, there was employed a plate with layers on both sides thereof from the same PdNiCu alloy on the substrate plate constituted from ferritic DIN steel 1.5732. The size of the catalyst surface again consisted of 48 cm$^2$. In this instance, the gas atmosphere contained the following gas constituents: 57.6% steam by volume, 32.9% air by volume, and 9.5% hydrogen by volume.

As in the preceding examples, also in this instance, did the catalytic reaction begin immediately after the introduction of the hydrogen into the gas atmosphere. After the addition of 0.165 bar hydrogen, the catalytic oxidation of hydrogen lead to a pressure drop-off, and the pressure in the reaction chamber fell from 1.85 bar to 1.60 bar within a few minutes. The temperature in the catalyst plate rose from initially 100° C. within 1 minute to a maximum of 250° C. Within a few minutes, the hydrogen converted into steam.

EXAMPLE 4

This example discloses the course of the reaction for a catalytic oxidation with the same PdNiCu alloy in a steam-enriched gas atmosphere. Selected for the catalyst plate were the same dimensions in correspondence with the preceding examples. Serving as the substrate material, was ferritic steel DIN 1.5732.

Figure 4:
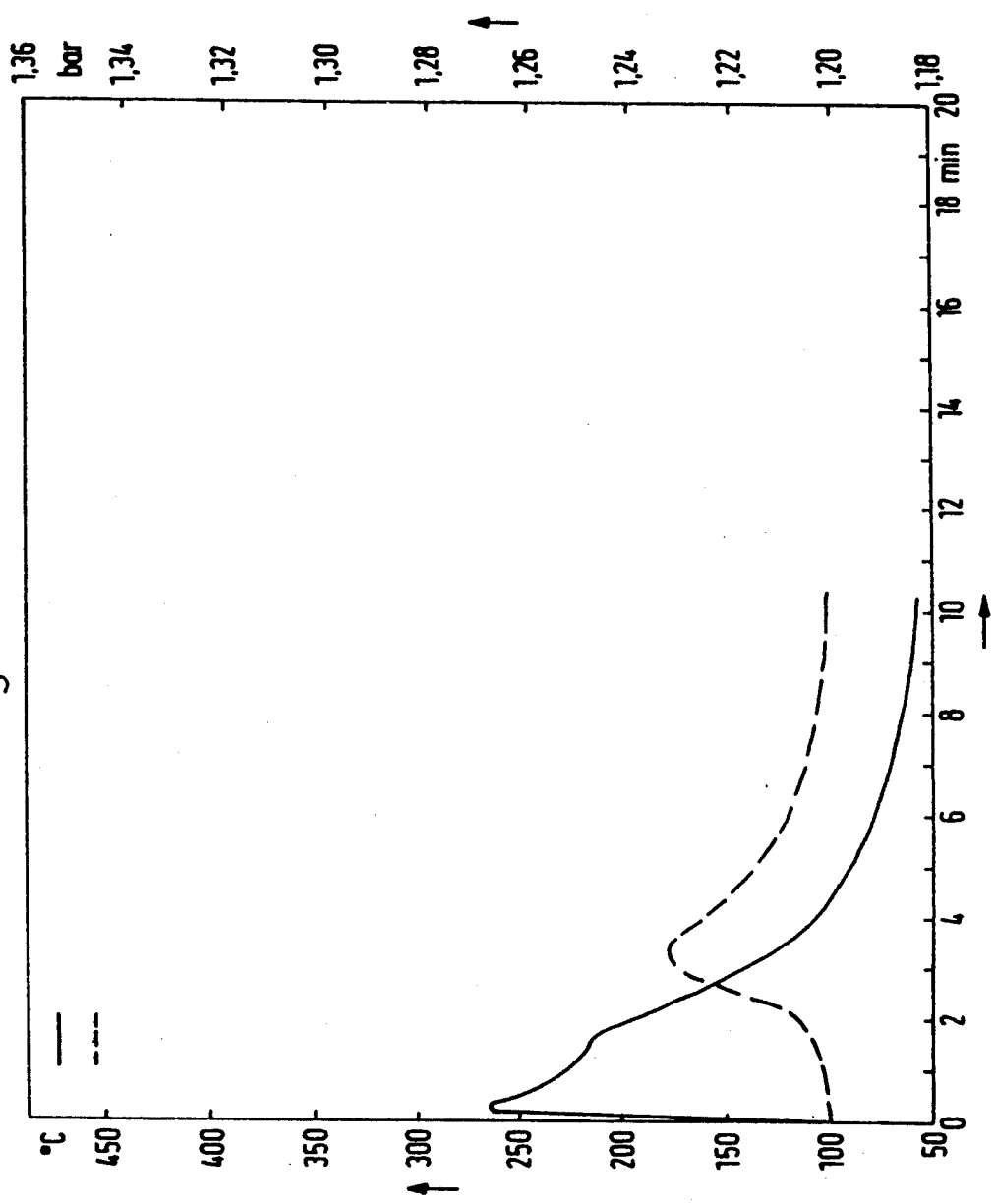
FIG. 4 illustrates a plot of the pressure and temperature course for a catalytic oxidation on a catalyst with the same substrate material as in FIG. 2 in an atmosphere of 79.2% steam by volume, 15.9% air by volume, and 4.9% $H_2$ by volume.
Figure 5:
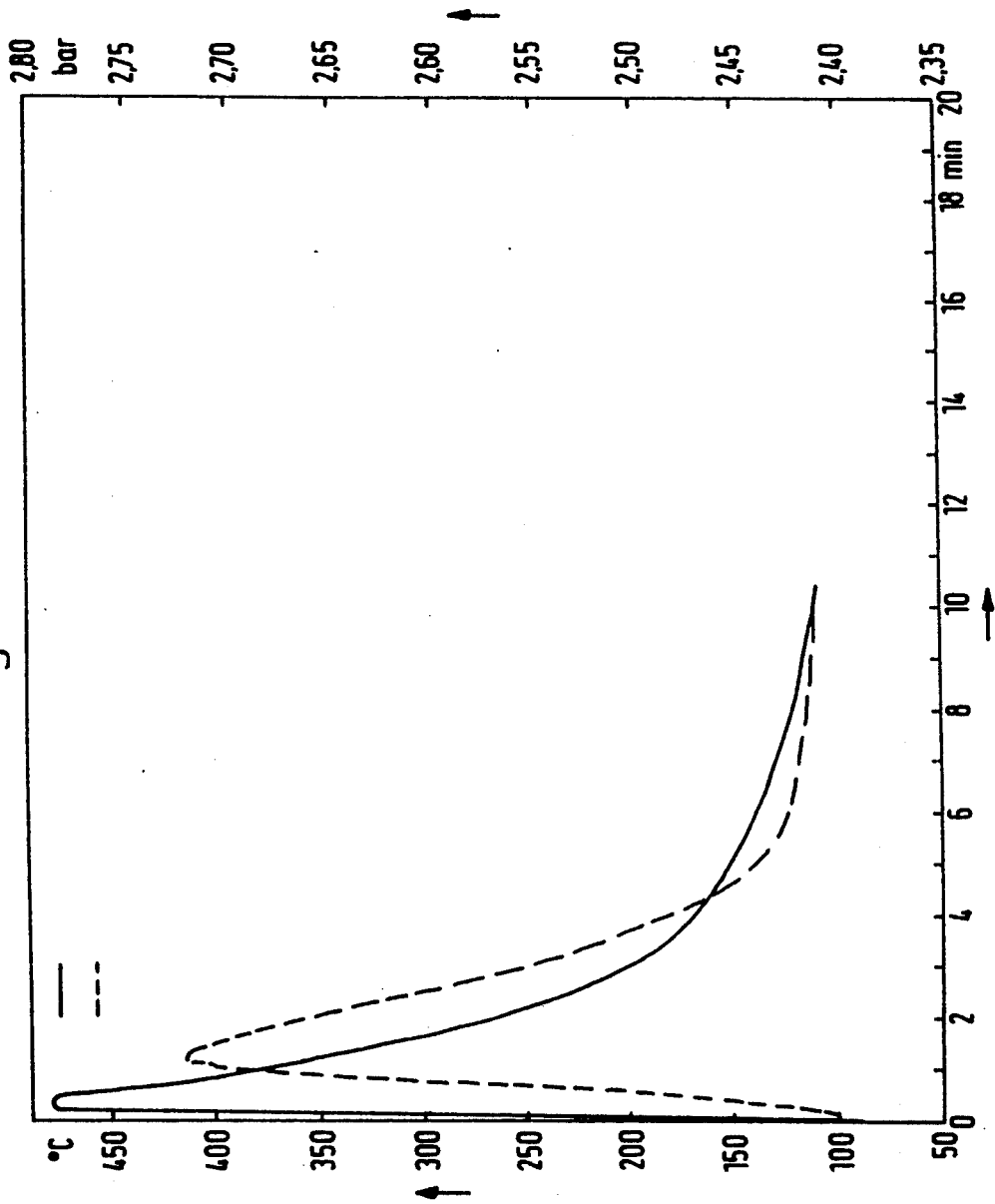
FIG. 5 illustrates a plot of the pressure and temperature course for a catalytic oxidation on a catalyst as indicated in FIG. 2 and with the same substrate material in an atmosphere with 42.5% steam by volume, 43.5% air by volume, and 14% $H_2$ by volume.

In the Example pursuant to FIG. 4, the reaction chamber contained a gas composition with the following gas constituents: 79.2% steam by volume, 15.9% air by volume and 4.9% H$_2$ by volume. Prior to the implementation of the experiment, a catalyst plate was exposed for 3.75 hours to a saturated steam atmosphere at 100° C. Immediately after the introduction of the hydrogen into the steam and air-containing atmosphere, there commenced the catalytic oxidation. With a rising pressure in the reaction chamber upon the addition of the hydrogen, there also rose the temperature of the catalyst plate. The catalytic oxidation of the hydrogen lead to a pressure drop-off, the pressure in the reaction chamber fell from about 1.27 bar within about 4 minutes to 1.2 bar. The temperature in the catalyst plate rose from initially 100° C. rapidly, and within 2 minutes reached a maximum of 180° C. Thereafter, the temperature dropped off again and already after 6 minutes reached its initial value of 100° C. The hydrogen was completely converted into steam due to the catalytic oxidation.

EXAMPLE 5

The reaction course was investigated with the same PdNiCu alloy on a substrated material consisting of steel DIN 1.5732 under a hydrogen-rich gas atmosphere. The plate surface dimensions correspond with those in Examples 2, 3 and 4. In the reaction chamber there was set an atmosphere with the following gas constituents: 42.5% steam by volume, 43.5% air by volume, and 14% H$_2$. Prior to the beginning of the catalytic reaction, the catalytic sheet metal was exposed for a period of 2.5 hours to a saturated steam atmosphere at 100° C.

In view of the instituting catalytic oxidation of the hydrogen, after the introduction thereof the pressure in the reaction chamber dropped off within 3 minutes from 2.77 bar to 2.40 bar. The temperature rose, due to the high H$_2$ concentration, within 1 minute from 100° C. up to a maximum temperature of 450° C. After three minutes, the plate again reached about its initial temperature, the temperature of the plate measured 115° C.

After the completion of the catalytic reaction, the catalyst plate evidenced a glossy surface. Any formation of fissures in a catalyst layer could not be ascertained through a microscopic observation.

What is claimed is:

1. A catalyst for the oxidation of hydrogen in an atmosphere containing hydrogen, oxygen and steam comprising a metal or equivalent metal alloy influencing the oxidation of hydrogen, said catalyst applied as a catalyst layer onto a substrate material, said substrate material being a carrier plate, mesh or granulate resistant to corrosion caused by steam; said catalyst layer and said substrate material having linear coefficients of expansion approximately equal to each other.

2. A catalyst as claimed in claim 1, wherein there is only a slight difference between the heat conductivity of the substrate material and the catalyst layer.

3. A catalyst as claimed in claim 1, wherein the substrate material is resistant to chemical attack by acidiferous compounds, alkaline compounds and toxic material.

4. A catalyst as claimed in claim 1, wherein the substrate material, upon a temperature rise during operation, forms only such mixed crystals or solid solution phases with hydrogen and oxygen which produce only slight changes in the matrix parameters.

5. A catalyst as claimed in claim 1, wherein the substrate material possesses low hydrogen solubility.

6. A catalyst as claimed in claim 1, wherein the forming of an oxide layer is precluded between the substrate material and the catalyst layer.

7. A catalyst as claimed in claim 1, wherein the catalyst layer is applied onto a sand-blasted substrate material.

* * * * *